Patented Jan. 17, 1928.

1,656,474

UNITED STATES PATENT OFFICE.

HARRY E. DUBIN, OF NEW YORK, N. Y., ASSIGNOR, BY MESNE ASSIGNMENTS, TO H. A. METZ LABORATORIES, INC., OF NEW YORK, N. Y., A CORPORATION OF NEW YORK.

EDIBLE FAT COMPOSITION.

No Drawing. Original application filed February 19, 1925, Serial No. 10,407. Divided and this application filed October 10, 1925. Serial No. 61,791.

United States Patent No. 1,455,254 in the name of Max Kahn discloses the use of odd-carbon fats, that is, glycerides of fatty acids having an odd number of carbon atoms, such as for instance the glyceride of margaric acid, for the treatment of acidosis. The melting point of glyceryl margarate is about 60° C., whereas edible fats should have a melting point of about 37° C., body temperature, or lower, and it has therefore been proposed, see Journal of the American Medical Association, 83, 1685, Nov. 22, 1924, to combined glyceryl margarate with liquid petrolatum and water, for example 82 parts of glyceryl margarate, 12 parts of liquid petrolatum and 6 parts of water, to secure a product having a melting point of about 37° C. This composition is objectionable in that it contains 18% of therapeutically inactive or valueless material and also on account of its unpalatable taste.

An object of the present invention is to produce an odd-carbon fat composition which is practically free of objectionable odor and taste, has a melting point sufficiently low to render it easily assimilated, and is free of therapeutically inactive materials.

I have found that mixtures of glyceryl margarate and ethyl margarate in suitable proportions meet these requirements. Ethyl margarate is a liquid at room temperature practically without odor or taste. Glyceryl margarate, as stated above, has a melting point of about 60° C. and an objectionable tallowy taste. Mixtures of ethyl margarate and glyceryl margarate containing 50% or more of ethyl margarate have melting points of 37° C. or less, are substantially odorless and tasteless and quite palatable. As the proportion of ethyl margarate in the mixture is increased the melting point is lowered and the assimilability by the body is improved. Mixtures containing 75% and more of ethyl margarate even to the practical exclusion of the glyceryl margarate are suitable with respect to odor, taste, palatability and consistency for use as, or in, foods.

In the foregoing description reference is made to compositions containing equal proportions of the ethyl margarate and glyceryl margarate, this being about the upper limit of glyceryl margarate content in compositions designed for use directly and alone as foods. It is to be understood, however, that the invention is not limited to compositions containing 50% or more of ethyl margarate. Smaller proportions of ethyl margarate produce to an extent corresponding to the proportion thereof used, the effects above referred to, that is, reduction of the melting point, elimination of objectionable odor and taste and improvement in the palatability and assimilability of the product. The invention is moreover not limited to compositions of ethyl margarate and glyceryl margarate. The invention embraces generally compositions comprising a plurality of compounds or products comprising or containing one or more odd-carbon fatty acids and having the characteristics described, that is, freedom from objectionable odor and taste, melting point sufficiently low to render them suitable for use as food and readily assimilated, and freedom from therapeutically inactive material. Among the combinations falling within the scope of my invention are mixtures of ethyl margarate with odd-carbon fats other than glyceryl margarate, mixtures of alkyl margarates other than ethyl margarate with glyceryl margarate, mixtures of alkyl margarates other than ethyl margarate with odd-carbon fats other than glyceryl margarate, mixtures of ethyl and other alkyl esters of odd-carbon fatty acids other than margaric acid with glyceryl margarate and other odd-carbon fats, and mixtures of two or more odd-carbon fats or two or more esters of odd-carbon fatty acids. It is also within the scope of my invention to add to the edible fat compositions of my invention coloring and flavoring materials and the like in the well known manner.

It has been proposed to add vitamines or vitamine concentrates or vitamine-containing food materials to food materials which do not contain or are deficient in vitamines for the purpose of producing a balanced vitamine-containing food. This expedient is particularly advantageous with respect to the synthetic fats designed for the treatment of acidosis described above. If a person suffering from diabetes and under treatment for acidosis is deprived of all natural vitamine-containing fats and is fed instead a synthetic fat such as the odd-carbon fat compositions above described, he is exposed to the danger of a deficiency of fat-soluble vitamines which are necessary to proper nutrition. In accordance with my present invention this difficulty is overcome by adding a fat-soluble vitamine concentrate to the odd-carbon fat compositions. The quantity of vitamine concentrate to be added to the fat of course depends upon the vitamine content or activity of the concentrate and the vitamine activity desired in the product. A suitable vitamine concentrate for this purpose is disclosed in an application filed June 28, 1923, in the names of Casimir Funk and Harry E. Dubin, Serial Number 648,390. The process of said application consists essentially in extracting a vitamine-containing material, such as cod-liver oil, with a solvent, such as glacial acetic acid, separating the resulting extract from the acetic acid, saponifying the extract and separating the unsaponified material which amounts to only about .0006 of the cod-liver oil used and contains practically all of the antiophthalmic and antirachitic vitamines originally present in the cod-liver oil treated. This vitamine concentrate may be further concentrated by the digitonin or other saponin precipitation in the usual manner to a mass amounting to only about .0002 of the oil from which it was derived. This vitamine concentrate may be added to the odd-carbon fat compositions described above in such proportions as to give a vitamine content equal for instance to that of butter or cod-liver oil, the quantity necessary being so small as to be entirely negligible so far as dilution of the odd-carbon fat content of the composition is concerned. An addition of 0.2 grams of the vitamine concentrate to 1000 grams of the fat will give a product having a vitamine content practically equal to that of cod-liver oil. I also contemplate the addition of vitamine concentrates containing the fat-soluble antiophthalmic and antirachitic vitamines to edible fats which are deficient in vitamines other than the odd-carbon fat compositions, for instance, to butter substitutes such as oleomargarine. The vitamine concentrate addition is so small that there is no possibility of imparting any objectionable flavor to the product.

This application is a division of my application Serial Number 10,407, filed February 19, 1925.

I claim:—

1. An edible composition consisting essentially of ethyl margarate, glyceryl margarate and fat-soluble vitamines.

2. An edible composition comprising an alkyl ester of a fatty acid having an odd number of carbon atoms, a glyceride of a fatty acid having an odd number of carbon atoms and fat-soluble vitamines.

3. An edible composition comprising at least 50 per cent of ethyl margarate, a relatively minute quantity of the soluble vitamine concentrate, said composition having a vitamine content equal to that of butter or of cod liver oil, as may be desired, and the remainder glyceryl margarate.

4. An edible composition comprising a vitamin free ester of an odd-carbon fatty acid, and fat soluble vitamins.

5. An edible composition comprising a vitamin free ester of margaric acid, and fat soluble vitamins.

In testimony whereof, I affix my signature.

HARRY E. DUBIN.